United States Patent
Guo

(10) Patent No.: US 8,550,432 B2
(45) Date of Patent: Oct. 8, 2013

(54) STOPCOCK

(75) Inventor: Ming-Lung Guo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 355 days.

(21) Appl. No.: 12/869,763

(22) Filed: Aug. 27, 2010

(65) Prior Publication Data

US 2011/0253925 A1    Oct. 20, 2011

(30) Foreign Application Priority Data

Apr. 15, 2010  (TW) ................................ 99111881 A

(51) Int. Cl.
  *F16K 5/02*       (2006.01)
  *F16K 51/00*      (2006.01)
(52) U.S. Cl.
  USPC ........ 251/309; 251/311; 251/904; 137/15.24; 137/315.25
(58) Field of Classification Search
  USPC ............. 137/15.24, 315.25, 315.26; 251/291, 251/292, 311, 312, 904
  See application file for complete search history.

(56) References Cited

U.S. PATENT DOCUMENTS

| | | | | |
|---|---|---|---|---|
| 1,664,712 A | * | 4/1928 | Stanley | 137/246.23 |
| 2,628,059 A | * | 2/1953 | Hinrichs | 251/296 |
| 2,696,363 A | * | 12/1954 | Monson | 251/316 |
| 3,554,490 A | * | 1/1971 | Cahoon, Jr. | 251/356 |
| 3,779,513 A | * | 12/1973 | Levine | 251/309 |
| 4,014,512 A | * | 3/1977 | Cheever et al. | 251/309 |
| 4,807,666 A | * | 2/1989 | Morse | 137/625.47 |
| 4,958,802 A | * | 9/1990 | Underwood | 251/310 |
| D361,246 S | * | 8/1995 | Peacock | D8/14 |
| 6,012,702 A | * | 1/2000 | Heimberger | 251/309 |
| 6,196,268 B1 | * | 3/2001 | Steiner et al. | 137/625.47 |
| 7,036,793 B2 | * | 5/2006 | Turnau et al. | 251/175 |

* cited by examiner

*Primary Examiner* — John K Fristoe, Jr.
*Assistant Examiner* — Seth W Mackay-Smith
(74) *Attorney, Agent, or Firm* — Altis & Wispro Law Group, Inc.

(57) ABSTRACT

A stopcock includes a housing and a sealing insert. The housing includes a first surface, a first blind hole defined in the first surface, and a through hole defined in a first bottom surface of the housing in the blind hole. The through hole tapers toward the bottom surface. The sealing insert includes a first engaging portion and a second engaging portion connected to the first engaging portion. The first engaging portion is engagingly received in the blind hole. The second engaging portion is engagingly received in the through hole.

7 Claims, 4 Drawing Sheets

STOPCOCK

BACKGROUND

1. Technical Field

The disclosure generally relates to stopcocks and, particularly, to a stopcock with reliable sealing performance.

2. Description of Related Art

A stopcock is a component of an injection mold used for switching on/off states of a water circuit. The water circuit is generally defined in a mold plate for introducing a coolant such as water therein to cool the mold plate. The coolant absorbs heat from the mold plate (which has absorbed heat from the hot plastic) and keeps the mold plate at a proper temperature to solidify the plastic. However, a conventional stopcock may have inferior sealing performance, and the water circuit may leak coolant when in use. Thus, the coolant in the water circuit may not absorb heat efficiently and solidify the plastic at an efficient rate, resulting in inferior molded products.

Therefore, what is needed, is a stopcock, which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiment of the stopcock will now be described in detail below and with reference to the drawings.

Figure 1:
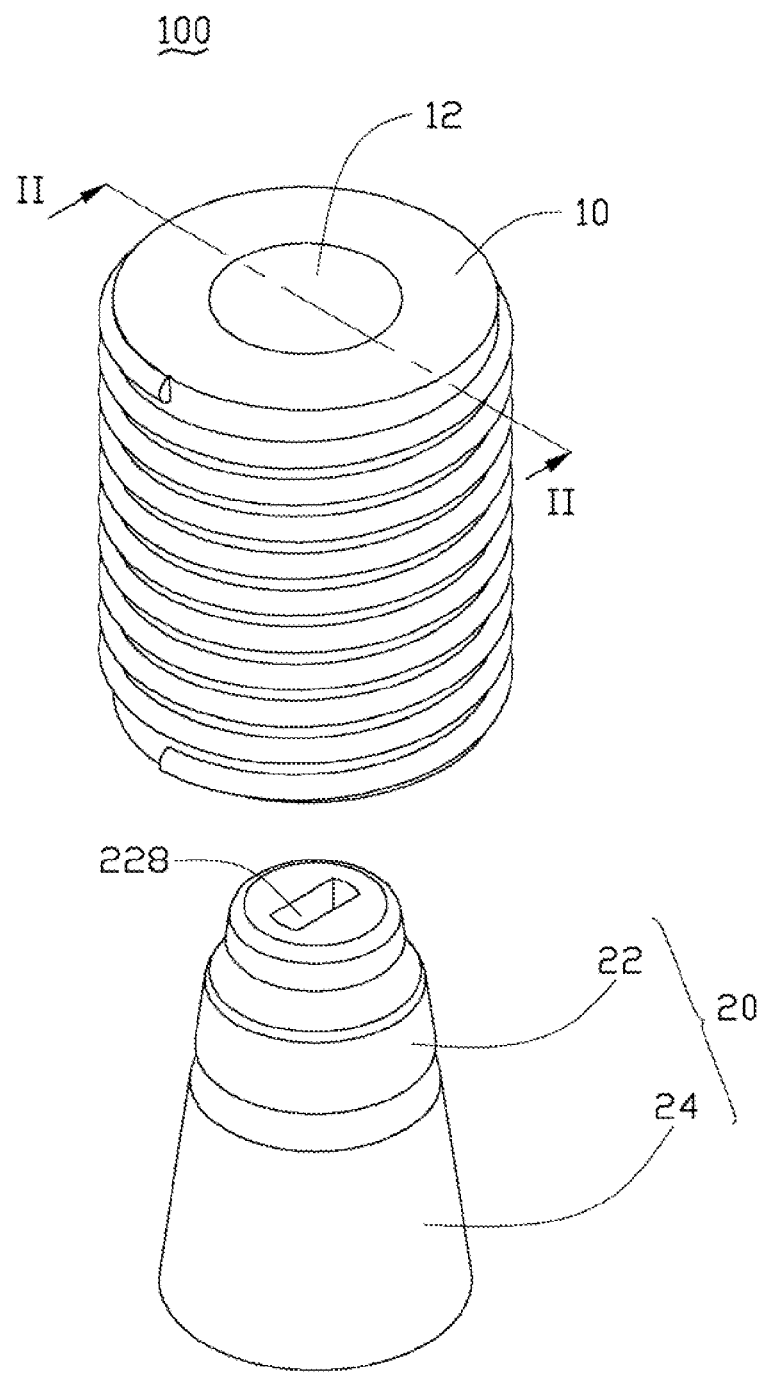
FIG. 1 is a disassembled and isometric view of a stopcock in accordance with an exemplary embodiment.

Referring to FIG. 1, a stopcock 100 in accordance with an exemplary embodiment is shown. The stopcock 100 includes a housing 10 and a sealing insert 20.

Figure 2:
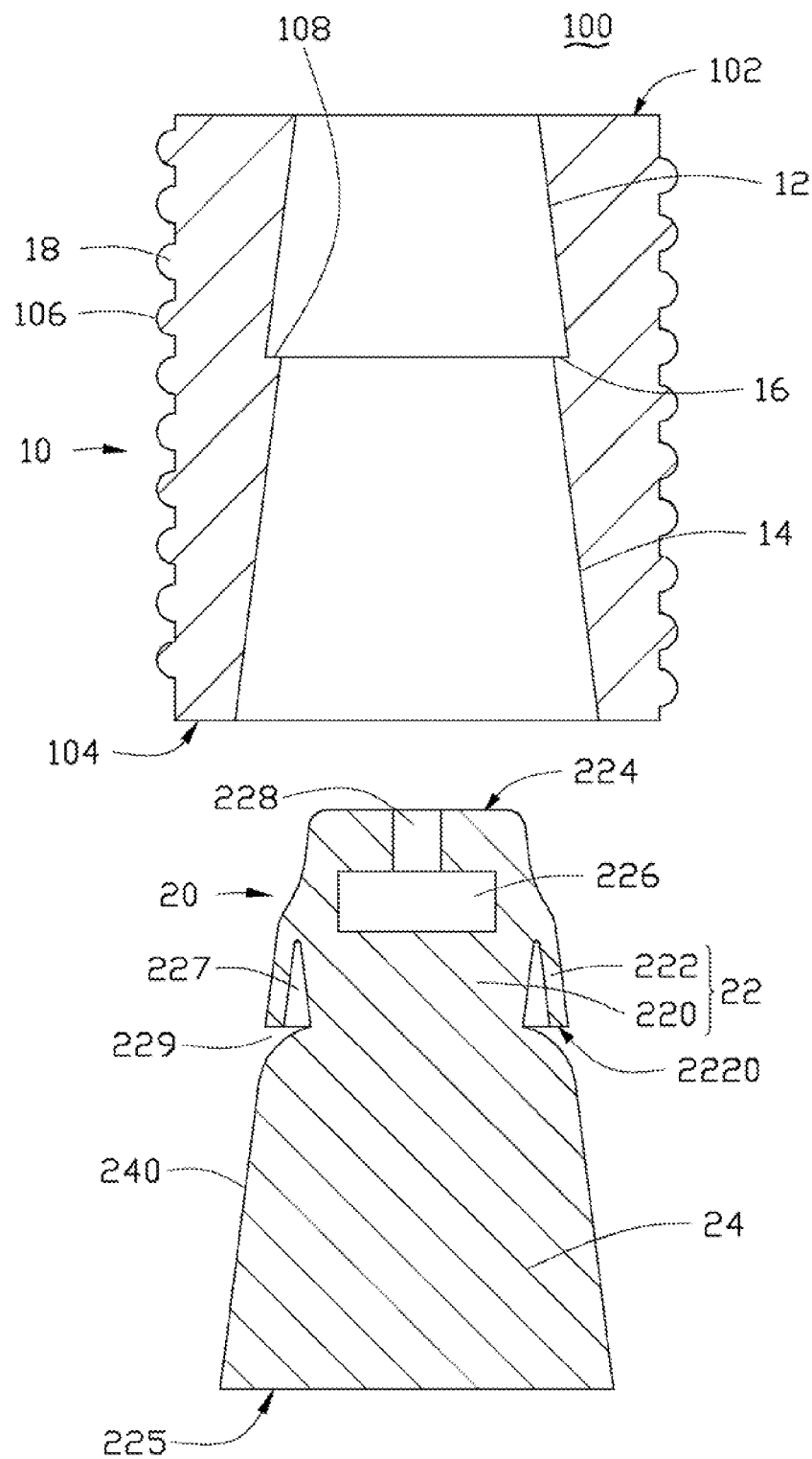
FIG. 2 is a sectional view of the stopcock of FIG. 1, taken from line II-II.

Referring to FIG. 2, in this embodiment, the housing 10 is in the form of a hollow cylinder, and includes a first upper surface 102, a first lower surface 104, and a peripheral surface 106. The first upper surface 102 and the first lower surface 104 are located at opposite sides of the housing 10. The peripheral surface 106 is located between and adjoins the first upper surface 102 and the first lower surface 104.

The housing 10 has a first blind hole 12 defined in the first upper surface 102. The housing 10 includes a first bottom surface 108 in the first blind hole 12. In addition, the housing 10 has a through hole 14 defined in the first bottom surface 108. The through hole 14 communicates with the first blind hole 12, and extends all the way through the first lower surface 104. In this embodiment, each of the first blind hole 12 and the through hole 14 has a frusto-conical shape. The through hole 14 tapers from the first lower surface 104 to the first bottom surface 108. The first blind hole 12 tapers from the first bottom surface 108 to the first upper surface 102. A diameter of the first blind hole 12 adjacent to the first bottom surface 108 is greater than a diameter of the through hole 14 adjacent to the first bottom surface 108, thus a step 16 is formed between the first blind hole 12 and the through hole 14. In alternative embodiments, the first blind hole 12 may have another shape, such as a cylindrical shape.

In this embodiment, the housing 10 has external threads defined in the peripheral surface 106. In use, the housing 10 can be threadedly coupled into a water circuit of a conventional mold plate (not shown).

The sealing insert 20 includes a second upper surface 224 and a second lower surface 225 at opposite ends thereof. In this embodiment, the sealing insert 20 includes a first engaging portion 22 and a second engaging portion 24 connecting to the first engaging portion 22. The first engaging portion 22 includes a main body 220 and an elastic engaging sleeve 222. The main body 220 is substantially cylindrical. The engaging sleeve 222 extends downwards from an outer surface of the main body 220 and surrounds the main body 220. In this embodiment, a first slot 227 is defined between the engaging sleeve 222 and the outer surface of the main body 220. The first slot 227 is annular. With this configuration, the engaging sleeve 222 is flexible towards the main body 220.

The main body 220 includes a sinkhole 226 defined in the second upper surface 224, and a second blind hole 228 communicating with the sinkhole 226. The second blind hole 228 extends all the way through the second upper surface 224. A diameter of the second blind hole 228 is smaller than that of the sinkhole 226.

In this embodiment, the second engaging portion 24 has a second slot 229 defined in an external side surface 240 thereof. The second slot 229 is annular, and communicates with the first slot 227. The engaging sleeve 222 of the first engaging portion 22 is exposed to the first and the second slots 227 and 229, as well as an outside of the sealing insert 20. In addition, the engaging sleeve 222 includes a second bottom surface 2220 exposed at the second slot 229.

In this embodiment, a configuration of the engaging sleeve 222 is shaped to conform to that of the first blind hole 12. That is, the engaging sleeve 222 tapers from the second bottom surface 2220 to the second upper surface 224. In addition, the second engaging portion 24 tapers from the second lower surface 225 toward the second bottom surface 2220. An edge section of the second engaging portion 24 distant from the second lower surface 225 is spaced from the engaging sleeve 222 by the second slot 229. In alternative embodiments, the sealing insert 20 may taper all the way from the second lower surface 225 to the second upper surface 224 with the second slot 229 defined in the second engaging portion 24. It is noteworthy that the first slot 227 and the second slot 229 constitute one annular slot actually and function as a first annular portion and a second annular portion of the annular slot, respectively.

Figure 3:
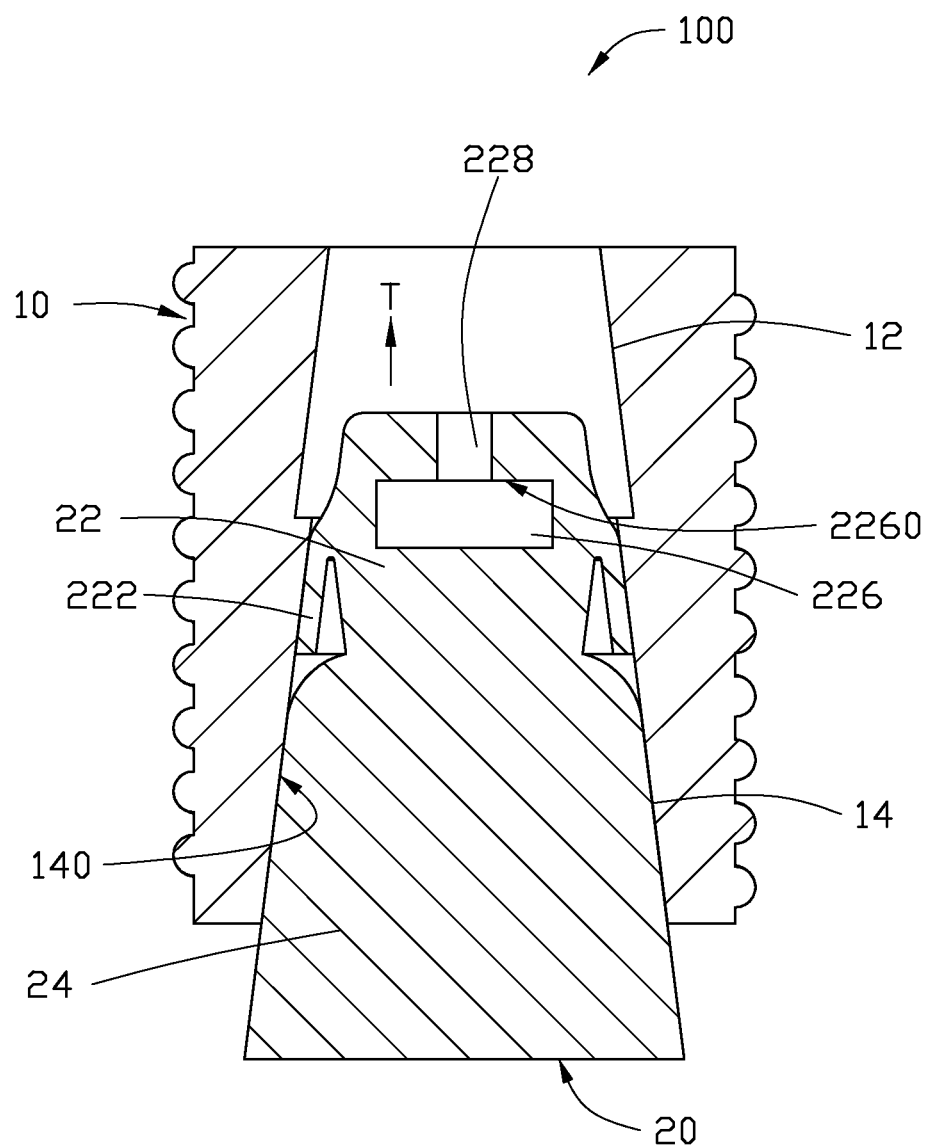
FIG. 3 is a schematic view of the stopcock of FIG. 2, during assembling.

Referring to FIG. 3, during assembling, a conventional tool (not shown) can be provided to pull the sealing insert 20 into the housing 10, thus the sealing insert 20 is coupled to the housing 10. In use, the tool may be inserted into the sinkhole 226 through the second blind hole 228 to engage an inner surface 2260 of the housing 10 in the sinkhole 226. Thus, the sealing insert 20 can be pulled along a direction T into the through hole 14 and the first blind hole 12. In this manner, the first engaging portion 22 is received in the blind hole 12. The first engaging portion 24 is received in the through hole 14. As shown in FIG. 3, before the first engaging portion 22 is received in the first blind hole 12, the first engaging portion 22 and the second engaging portion 24 both engage with an inner sidewall 140 of the housing 10 in the through hole 14.

Figure 4:
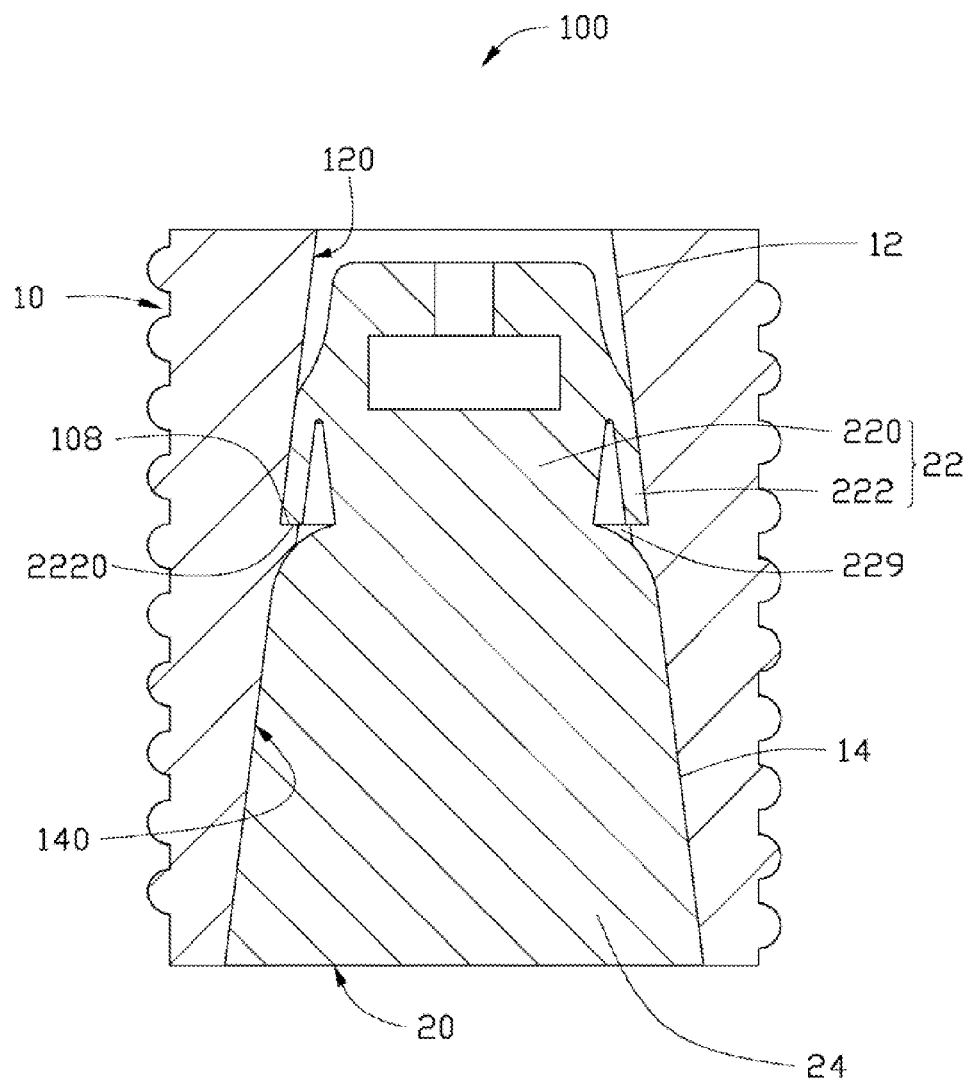
FIG. 4 is an assembled view of the stopcock of FIG. 2.

Referring to FIG. 4, when the sealing insert 20 is pulled and moved along the direction T (shown in FIG. 3), the engaging sleeve 222 is compressed and distorted towards the main body 220, thus being slidably inserted into the first blind hole 12. In this embodiment, when the engaging sleeve 222 is being inserted into the first blind hole 12, in one aspect, the compression force is released, the engaging sleeve 222 resumes and fittingly engages with an inner sidewall 120 of the housing 10 in the first blind hole 12. Thus, the first blind hole 12 of the housing 10 is sealed by the first engaging portion 22. In another aspect, the second engaging portion 24 fittingly engages with the inner sidewall 140 of the housing 10 in the through hole 14. Thus, the through hole 14 of the housing 10 is sealed by the second engaging portion 24.

In this embodiment, a base material of the housing 10 can be brass. A base material of the sealing insert 20 can be steel. In use, as a coefficient of thermal expansion (CTE) of the brass is relatively high, when the stopcock 100 is applied in the water circuit and the water in the water circuit is heated, the housing 10 may expand to seal the water circuit. In addition, as the brass has an anti-corrosive property, thus corrosive interaction between the housing 10 and the sealing insert 20 is minimized.

In this embodiment, a diameter of the second engaging portion 24 is slightly greater that that of the housing 10 measured in the through hole 14. Thus, the second engaging portion 24 is interferentially received in the through hole 14. The second engaging portion 24 and the housing 10 exert pressure on each other when the second engaging portion 24 is received in the through hole 14. In addition, the step 16 of the housing 10 is engagingly received in the second slot 229 between the first engaging portion 22 and the second engaging portion 24. The first engaging portion 22 is received in the blind hole 12 with the second bottom surface 2220 engaging with the first bottom surface 108 of the housing 10. For example, the second bottom surface 2220 may intimately contact the first bottom surface 108. With this configuration, the sealing insert 20 cannot be detached from the housing 10 when the sealing insert 20 is coupled to the housing 10, thus reliable sealing performance of the stopcock 100 is achieved.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A stopcock comprising:
    a housing comprising a first upper surface and a first lower surface opposite to the first upper surface, the housing defining a first hole in the first upper surface, the first hole having a first bottom surface, the housing defining a through hole in the first bottom surface and extending through the first lower surface, the first hole continuously tapering from the first bottom surface to the first upper surface, the through hole continuously tapering from the first lower surface to the first bottom surface, a dimension of the first hole adjacent to the first bottom surface being greater than a dimension of the through hole adjacent to the first bottom surface, thereby forming a step between the first hole and the through hole; and
    a sealing insert comprising a first engaging portion and a second engaging portion connected to the first engaging portion, the first engaging portion being engagingly received in the first hole, the second engaging portion being engagingly received in the through hole, the sealing insert defining an annular slot between the first engaging portion and the second engaging portion, the annular slot having a first annular portion and a second annular portion communicating with each other, the first engaging portion comprising a main body and an elastic engaging sleeve surrounding the main body with the first annular portion intervening therebetween, the second annular portion surrounding the second engaging portion, the engaging sleeve being shaped to conform to the first hole and flexible toward the main body, the engaging sleeve comprising a second bottom surface exposed at the second annular portion, the engaging sleeve engaging with the step.

2. The stopcock of claim 1, wherein the main body comprises:
    a second upper surface facing away from the second engaging portion;
    a sinkhole defined in the main body; and
    a second hole defined in the second upper surface, the second blind hole communicating with the sinkhole, a diameter of the second blind hole being smaller than that of the sinkhole.

3. The stopcock of claim 1, wherein the housing is made of brass.

4. The stopcock of claim 1, wherein the sealing valve is made of steel.

5. The stopcock of claim 1, wherein the housing comprises a peripheral surface connecting between the first upper surface and the first lower surface and defines external threads in the peripheral surface.

6. The stopcock of claim 1, wherein the first annular portion has a substantially triangular cross-section.

7. The stopcock of claim 1, wherein the engaging sleeve comprises a second bottom surface facing the second annular portion, and the first annular portion is defined in the second bottom surface.

* * * * *